Oct. 19, 1926.
W. W. SIBSON
DRYING MACHINE
Filed Oct. 20, 1920 2 Sheets-Sheet 2
1,603,810
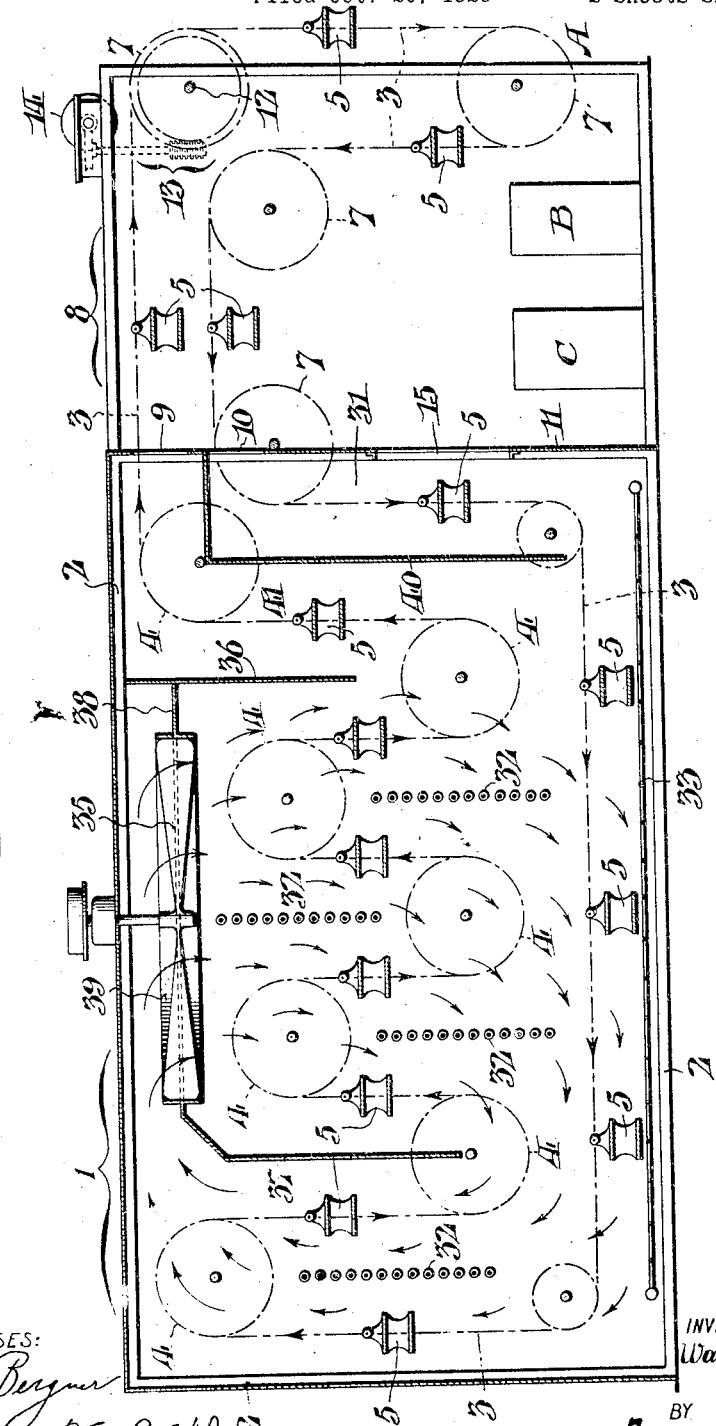
INVENTOR:
Walter W. Sibson
WITNESSES:
BY
ATTORNEYS.

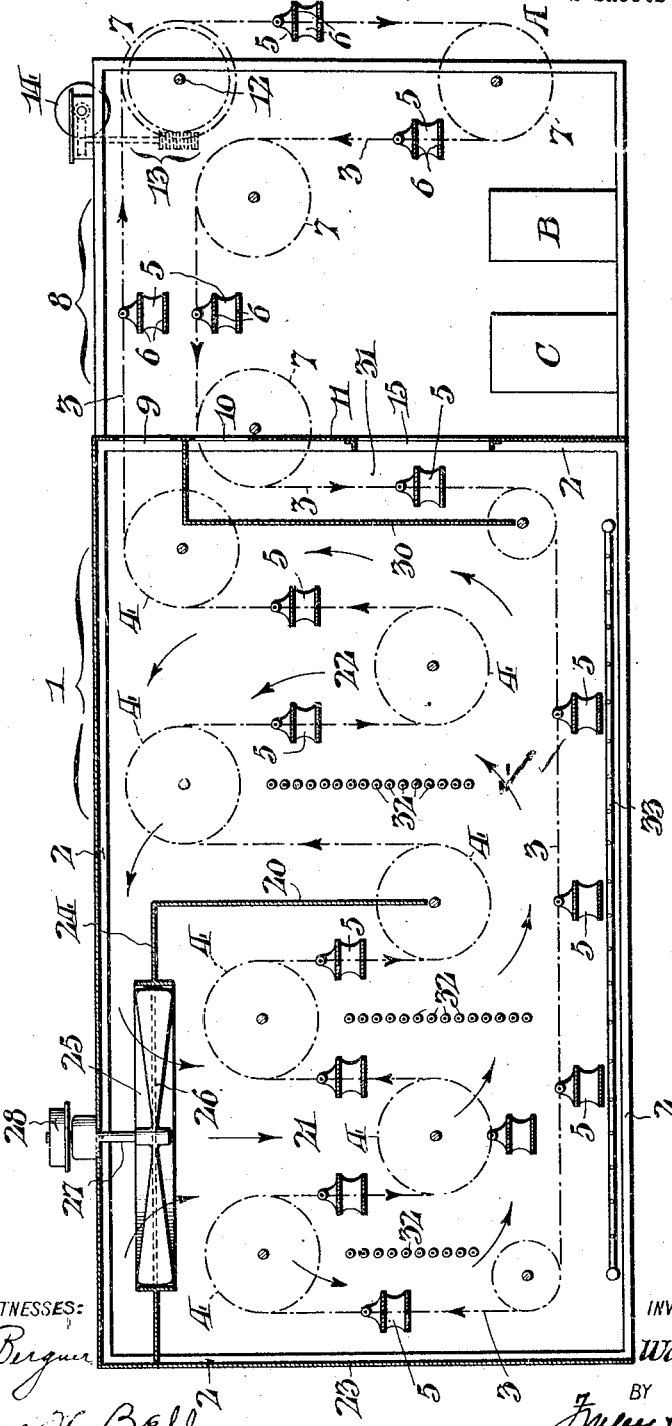

Patented Oct. 19, 1926.

1,603,810

UNITED STATES PATENT OFFICE.

WALTER W. SIBSON, OF PHILADELPHIA, PENNSYLVANIA, ASSIGNOR TO THE PHILADELPHIA DRYING MACHINERY COMPANY, OF PHILADELPHIA, PENNSYLVANIA, A CORPORATION OF PENNSYLVANIA.

DRYING MACHINE.

Application filed October 20, 1920. Serial No. 418,206.

The invention relates to drying machines, and more particularly to machines for drying china, porcelain, crockery, etc. Drying machines of the latter type are usually in the form of enclosures within which the air is heated, and, in order to hasten the drying action, circulated so as to impinge upon the materials under treatment. At the same time, the materials are slowly progressed through the enclosure by suitable supporting means usually in the form of endless conveyors. It has been heretofore generally customary to load and unload such machines respectively through openings at opposite ends. While satisfactory in some respects, this arrangement has always been open to the objection that the operatives in charge of the loading and unloading were at a disadvantage in so far as team work is concerned, on account of the remoteness of their respective stations. This, it will be seen, often necessitated stoppage of the machine to enable one or the other of the operatives "to catch up".

One object of my invention is to obviate the disadvantage pointed out above, and this I accomplish by providing both for loading and unloading at one and the same end of the machine, so that the operatives may work in unison, and the machine, without any difficulty, may be kept running and loaded to full capacity under direct supervision of the chief operative of the team. By my invention, I also obviate to a great extent, the difficulty of preventing the escape of the circulated air from within the machine.

Other advantages of my invention will become readily apparent from the detailed description which follows.

In the drawings, Fig. I is a longitudinal sectional view more or less diagrammatically representing a drying machine conveniently embodying my invention.

Fig. II is a similar view of a slightly modified form of the same.

Referring first to the form illustrated in Fig. I, the machine there shown is in the form of an enclosure 1, which comprises a skeleton structure 2 serviceable as a mounting for metallic sheathing or paneling so as to afford as a whole, a fire proof structure after the usual practice in this art. Traveling a circuitous course, (in this instance a series of vertical loops), through the enclosure is an endless conveyor represented conventionally in dot and dash lines at 3. This conveyor is similar to the one shown and described in a Patent No. 1,322,279 granted to T. Allsop and W. W. Sibson, November 18, 1919, and likewise comprises a pair of endless chains which run over sprockets 4—4 at opposite sides of the enclosure, which definitely determine the course of the conveyor. Between said chains of the conveyor 3 are hung carriers 5, provided with one or more shelves or trays 6—6, the attachment of said carriers being such as permit ready swinging about the various sprockets of the system. From the illustration, it will be noted that a portion of the conveyor circuit is wholly exposed at the exterior of the enclosure, and that the sprockets 7 by which this external portion of the circuit is determined are mounted on an appropriate extension 8 of the structural frame 2 of the machine. For the passage of the carriers 5 of the conveyor 3 through the end wall 11, there are provided openings 9 and 10 near its top. The exterior portion of the conveyor 3, it will be seen, extends first horizontally outward overhead and then downwardly in the form of a vertical loop, so as to be conveniently accessible both for loading and unloading. Unloading is accomplished at "A" where the operative there stationed removes the molds containing the dried articles from the conveyor carriers 5 and places them upon a truck or other suitable conveyance (not shown) by which they may be transferred to other parts of the manufacturing plant for succeeding operations which are to be performed upon them. The molds containing the articles to be dried are loaded upon the conveyor carriers through an opening 15 in the end wall 11 of the enclosure 1 by the chief operative or "jiggerman" stationed at "C". There is also a station "B" provided for an assistant or helper. By this arrangement, the several operatives may readily work in unison and keep the machine going to full capacity without necessity for any interruption whatever all the work being done under direct supervision of the chief operative or "jiggerman." In the present instance, I have shown the conveyor 3 as driven by means of a worm gear connection 13 operative upon the shaft 12 of the sprockets 7 at the upper right-hand end of the structure. The worm gear connection 13 may be connected, in any approved manner, with a driving pulley 14.

The enclosure 1 is subdivided by a centrally located partition 20 into two sections 21, 22, said partition 20 terminating short of both the top and bottom of the enclosure to afford passages for air circulation. Spanned between the top edge of the partition 20 and the end wall 23 is a horizontal diaphragm or partition 24 having an opening 25 within which revolves a rotary fan 26. The shaft 27 of this fan extends to the exterior to afford attachment for a pulley 28, which may be constantly driven from any convenient source of power. By rotation of the fan 26, the air will be driven over a general longitudinal course between the subdivisions 21 and 22 of the enclosure in a manner clearly suggested by the arrows in the illustration. Obviously, reverse rotation of the fan 26 will cause circulation in a direction counter to that indicated. For the purpose of preventing the escape of the circulating air through the openings 9, 10 in the end wall 11, I have provided an auxiliary vertical partition 30 which is spaced from said end wall. This partition 30 forms a channel 31 through which the initial run of the conveyor 3 within the enclosure 1 passes. The escape of small amounts of the circulated air through the openings 10 and 15 is readily compensated for by free influx through the opening 9 under suction of the fan 26. The air in the enclosure is heated by means of pipe coils 32 at intervals in its length, and preferably between adjacent runs of the conveyor 3. When the nature of the articles being dried is such as to require a certain amount of humidification for proper treatment, the necessary moisture may be supplied from a spray pipe 33, which in the present instance is shown as extending along the bottom of the enclosure 1.

Referring now to the type of my invention shown in Fig. II, it will be seen that the general arrangement of the conveyor circuit is the same as that described in connection with the previous form, and for this reason, I have employed the same reference numerals to designate the various corresponding elements. In this case, however, the interior arrangement of the enclosure is somewhat different. The course of air circulation set up by the fan 35—and indicated by the arrows—is determined by partitions 36 and 37 which are joined by a horizontal diaphragm 38 within an opening 39 of which the fan 35 runs. The partitions 36 and 37, it will be seen, terminate short of the bottom of the enclosure to afford passages, in the one case, for the entry of the conveyor carriers 5 into the field of the fan 5, and in the other, to allow for the passage of the air in circulating. The partition 36 furthermore extends to the very top of the enclosure 1 for a purpose which will become apparent presently. The course of the circulation set up by the fan 35 is obvious from the arrows, without necessity for further detailed description. The pipe coils 32 serve to heat the air as before. The auxiliary partition shown at 40 serves the same general purpose as the partition 30 of the first embodiment. By cooperation with the partition 36, furthermore, this affords besides the channel 31 for the first run of the conveyor, a second channel 41, which is neutral in so far as the air circulation is concerned, and serves to prevent escape of the air through the openings in the end wall 11.

It is to be particularly noted in connection with both embodiments of my invention that while traveling through the machine, the articles under treatment are impinged upon by the air from various angles as the conveyor carriers move from one position to another, thus insuring thorough and complete drying. It is also to be noted that practically the entire run of the conveyor 3 upon the interior is utilized for drying the wares, and further, that by having the openings 9, 10 and 15, only at one end of the machine, through drafts are entirely eliminated, thus lessening the tendency of the heated air to escape and incidentally making it more comfortable for the operatives to work at the machine. These features, it will be seen, serve collectively to increase the general efficiency of the drier to a very appreciable extent.

Having thus described my invention, I claim:

1. In a drying machine, an enclosure, an endless conveyor, and means affording support at one end thereof to establish a vertically looped and wholly exposed interval of travel in advance of said enclosure, whereby the operations of forming, feeding-in and unloading are effected in close relation.

2. In a drying machine, an enclosure, an endless conveyor, and means to establish a wholly exposed angularly looped interval of travel for the conveyor in advance of said enclosure, whereby loading and unloading are effected in close juxtaposition.

3. In a drying machine, an enclosure, an endless conveyor, and a framework at one end of said enclosure provided with means, whereby a portion of the conveyor circuit is caused to traverse a looped and wholly exposed course in advance of said enclosure, so that loading and unloading are effected in close relation.

4. In a drying machine including an enclosure and an endless conveyor, the combination of an extension framework and means whereby a portion of the conveyor circuit is caused to traverse a looped and wholly exposed course in advance of the enclosure.

In testimony whereof, I have hereunto signed my name at Philadelphia, Pennsylvania, this 14th day of October 1920.

WALTER W. SIBSON.